(12) United States Patent
Chastain et al.

(10) Patent No.: US 7,246,118 B2
(45) Date of Patent: Jul. 17, 2007

(54) METHOD AND SYSTEM FOR AUTOMATED COLLABORATION USING ELECTRONIC BOOK HIGHLIGHTS AND NOTATIONS

(75) Inventors: Alicia Anne Chastain, Raleigh, NC (US); Christopher Joseph Paul, Durham, NC (US); David Mark Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 09/900,551

(22) Filed: Jul. 6, 2001

(65) Prior Publication Data

US 2003/0009459 A1    Jan. 9, 2003

(51) Int. Cl.
*G06F 7/00*  (2006.01)
*G06F 15/00* (2006.01)

(52) U.S. Cl. ............... 707/7; 707/3; 707/4; 715/501.1; 715/512; 715/530

(58) Field of Classification Search ............ 707/1–10, 707/104.1; 715/501.1, 526, 512, 711, 716, 715/764, 500, 530–531, 533, 500.1; 345/751–753
See application file for complete search history.

(56) References Cited

U.S. PATENT DOCUMENTS

| | | | | |
|---|---|---|---|---|
| 5,157,783 A | * | 10/1992 | Anderson et al. | 707/4 |
| 5,247,661 A | * | 9/1993 | Hager et al. | 707/104.1 |
| 5,428,529 A | * | 6/1995 | Hartrick et al. | 715/513 |
| 5,664,207 A | * | 9/1997 | Crumpler et al. | 715/505 |
| 5,794,178 A | * | 8/1998 | Caid et al. | 715/531 |
| 5,819,271 A | * | 10/1998 | Mahoney et al. | 707/10 |
| 5,835,089 A | * | 11/1998 | Skarbo et al. | 345/751 |
| 5,835,712 A | * | 11/1998 | DuFresne | 707/10 |
| 5,835,758 A | * | 11/1998 | Nochur et al. | 707/102 |
| 5,893,132 A | * | 4/1999 | Huffman et al. | 715/532 |
| 5,970,483 A | | 10/1999 | Evans | 707/3 |
| 5,983,248 A | * | 11/1999 | DeRose et al. | 715/513 |
| 6,101,503 A | | 8/2000 | Cooper et al. | 707/104 |
| 6,112,212 A | * | 8/2000 | Heitler | 715/501.1 |
| 6,138,129 A | * | 10/2000 | Combs | 707/6 |
| 6,192,396 B1 | * | 2/2001 | Kohler | 709/206 |

(Continued)

FOREIGN PATENT DOCUMENTS

WO        WO 00/62169        10/2000

OTHER PUBLICATIONS

"E-Books and the Future of Reading"—Beverly L. Harrison May/Jun. 2000 IEEE Computer Graphics and Application (pp. 32-39).*

(Continued)

*Primary Examiner*—John Breene
*Assistant Examiner*—Anh Ly
(74) *Attorney, Agent, or Firm*—Duke W. Yee; A. Bruce Clay; Wayne P. Bailey (57) ABSTRACT

The present invention provides a method, apparatus, and computer implemented instructions for sharing highlighted passages and notations in an electronic book. A user can highlight passages and/or notes, which are tagged and automatically sent to a designated set of recipients. The designated recipients can enter search criteria so that the highlighted passages and/or notes are displayed in their electronic book based on the specified criteria.

5 Claims, 7 Drawing Sheets

U.S. PATENT DOCUMENTS

| | | | |
|---|---|---|---|
| 6,195,667 B1* | 2/2001 | Duga et al. | 715/513 |
| 6,308,188 B1* | 10/2001 | Bernardo et al. | 715/530 |
| 6,331,865 B1* | 12/2001 | Sachs et al. | 715/776 |
| 6,331,867 B1* | 12/2001 | Eberhard et al. | 345/864 |
| 6,363,352 B1* | 3/2002 | Dailey et al. | 715/530 |
| 6,396,513 B1* | 5/2002 | Helfman et al. | 345/752 |
| 6,411,973 B1* | 6/2002 | Yianilos | 715/512 |
| 6,442,606 B1* | 8/2002 | Subbaroyan et al. | 709/224 |
| 6,457,026 B1* | 9/2002 | Graham et al. | 715/512 |
| 6,557,015 B1* | 4/2003 | Bates et al. | 715/501.1 |
| 6,624,826 B1* | 9/2003 | Balabanovic | 715/512 |
| 6,687,876 B1* | 2/2004 | Schilit et al. | 715/512 |
| 6,697,999 B1* | 2/2004 | Breuer et al. | 715/513 |
| 6,714,214 B1* | 3/2004 | DeMello et al. | 715/711 |
| 6,721,729 B2* | 4/2004 | Nguyen et al. | 707/3 |
| 6,928,610 B2* | 8/2005 | Brintzenhofe et al. | 715/517 |
| 7,020,663 B2* | 3/2006 | Hay et al. | 707/104.1 |
| 2001/0039552 A1* | 11/2001 | Killi et al. | 707/500 |
| 2002/0030843 A1* | 3/2002 | Tuli | 358/1.15 |
| 2002/0035697 A1* | 3/2002 | McCurdy et al. | 713/200 |
| 2002/0057293 A1* | 5/2002 | Liao | 345/781 |
| 2002/0091734 A1* | 7/2002 | Redlich et al. | 707/511 |
| 2002/0099775 A1* | 7/2002 | Gupta et al. | 709/205 |
| 2002/0099777 A1* | 7/2002 | Gupta et al. | 709/206 |
| 2002/0184189 A1* | 12/2002 | Hay et al. | 707/1 |
| 2002/0194300 A1* | 12/2002 | Lin et al. | 709/217 |
| 2003/0206189 A1* | 11/2003 | DeMello et al. | 345/711 |
| 2004/0199529 A1* | 10/2004 | Clark et al. | 707/100 |
| 2004/0233235 A1* | 11/2004 | Rubin et al. | 345/738 |

OTHER PUBLICATIONS

"Using the WWW as the Delivery Mechanism for Interactive, Visualization-Based Instructional Modules"—Thomas Naps, Josep Bergin, Ricardo Jimenez-Peris, Myles F. McNally, Matta Patino-Martinez, Vierra K. Proulx and Jorma Tarhio—1997 ACM (pp. 13-26).*

"Toward a Rhetoric of Informating Texts"—Stuart Moulthrop—Dec. 4, 1992 ACM (pp. 171-180).*

"To Dream the Possible Dream"—Raj Reddy—Communications of The ACM May 1998 (pp. 105-112).*

* cited by examiner

METHOD AND SYSTEM FOR AUTOMATED COLLABORATION USING ELECTRONIC BOOK HIGHLIGHTS AND NOTATIONS

FIELD OF THE INVENTION

The present invention relates generally to an improved data processing system. Still more particularly, the present invention relates to the sharing of highlighted passages and notations in an electronic book.

BACKGROUND OF THE INVENTION

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach. Many sources of information are available on the Web, including electronic books and journals. The demand and need to gather information quickly is increasing as technology advances.

When using an electronic book, referred to as an "e-book", a user has the ability to highlight and notate text for further reference. Various methods exist providing users the facility of tagging specific passages of e-book text. These methods include allowing the user to highlight passages of text and notate partial or complete sections of text. The ability to share this information is desired. E-books may contain large amounts of text. Multiple people may view the same e-book. When others want to discuss various areas of the e-book, referring back to highlighted text is desired, but may be cumbersome and time consuming due to the size of the electronic book. Therefore, it would be advantageous to have an improved method, apparatus, and computer instructions to share information gathered from the electronic book.

SUMMARY OF THE INVENTION

The present invention provides a method, apparatus, and computer implemented instructions for sharing highlighted passages and notations in an electronic book. A user can highlight passages and/or notes, which are tagged and automatically sent to a designated set of recipients. The designated recipients can enter search criteria so that the highlighted passages and/or notes are displayed in their electronic book based on the specified criteria.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
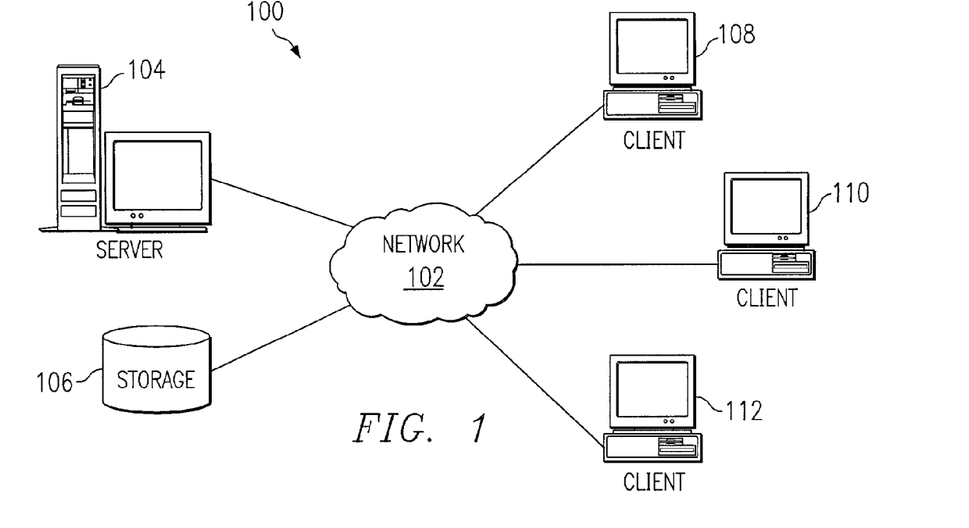
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
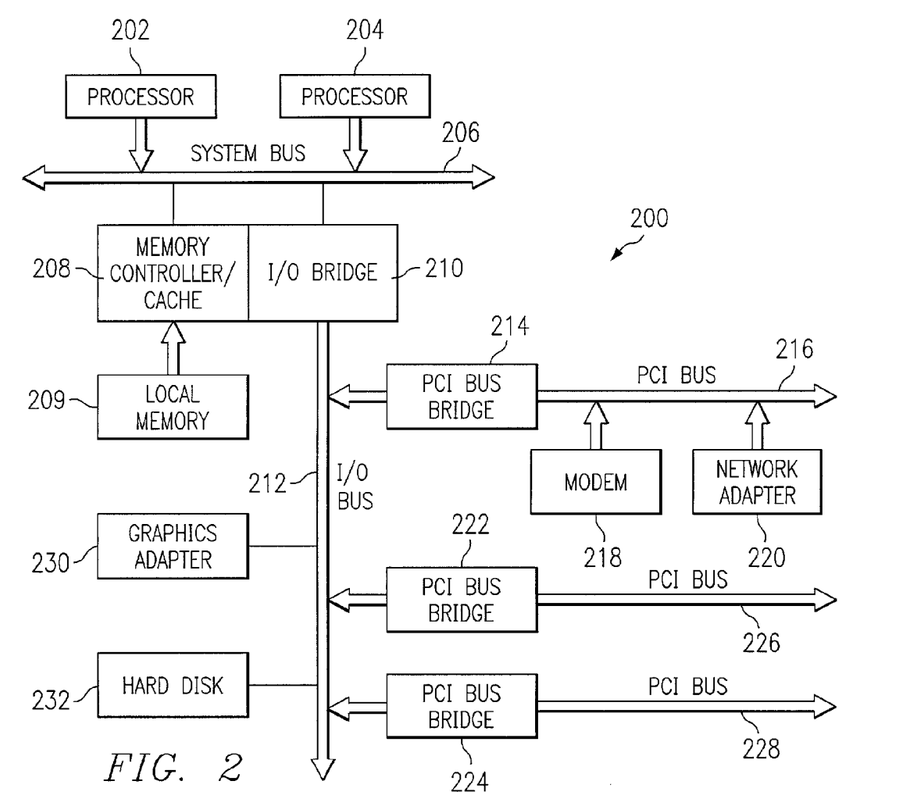
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
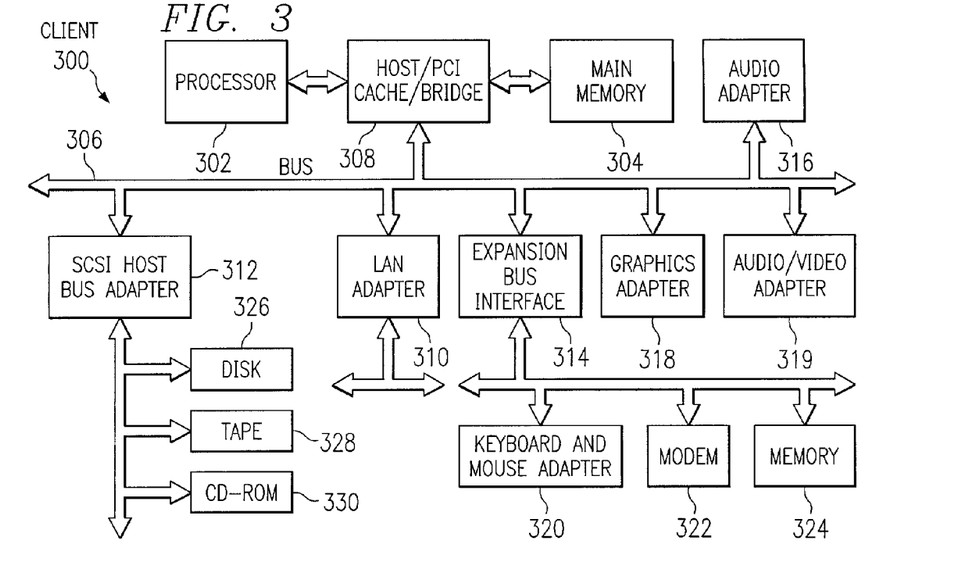
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
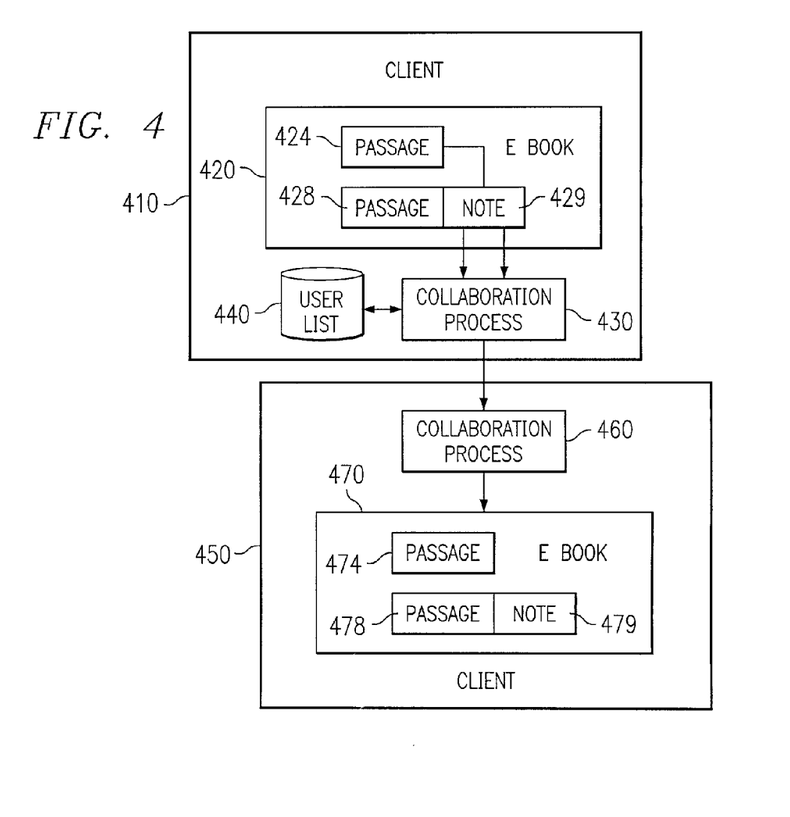
FIG. 4 is a block diagram of a collaboration process for electronic books in accordance with a preferred embodiment of the present invention.

Turning next to FIG. 4, a block diagram of a data processing system illustrating a collaboration process for electronic books is depicted in accordance with a preferred embodiment of the present invention. Client 410 may be used to display an e-book 420. A user can highlight or select passages 424 and 428 within an e-book, which may be sent to other e-book users. A note, such as note 429 may be associated with a passage, such as passage 428. This note also will be tagged for transmission to another user in these examples. Alternatively a note may be sent without a highlighted passage. These notes may contain text, such as comments about the passage or may contain other information. For example, a note may contain references that related to the passage. The reference may refer to anything about the text, such as, for example, a book title, author, publisher, publication date, ISBN number, section, chapter, page, paragraph, topic, subject, or category. Other information that may be included in a note are, for example, a user name, the name of the user highlighting the text, career field, interests, and other books being researched.

The primary user, depicted as client 410 in the block diagram, may designate a set of recipients through the use of a collaboration process 430 by selecting other e-book users or groups of e-book users from a user list 440. The highlighted or selected passages and/or notes can be sent to another e-book user such as client 450, where the user name for client 450 is included in the user list 440. Collaboration process 460 highlights, in e-book 470 passages 474 and 478 and note 479, which correspond to passages 424 and 428 and note 429 from e-book 420. These passages are transmitted through a communications link that is used to download book content to the e-book. A server, such as server 200 in FIG. 2, is used to relay the information in a manner similar to email. For example, a server, such as Lotus Domino, could use email mechanisms to facilitate the collaboration.

Figure 5:
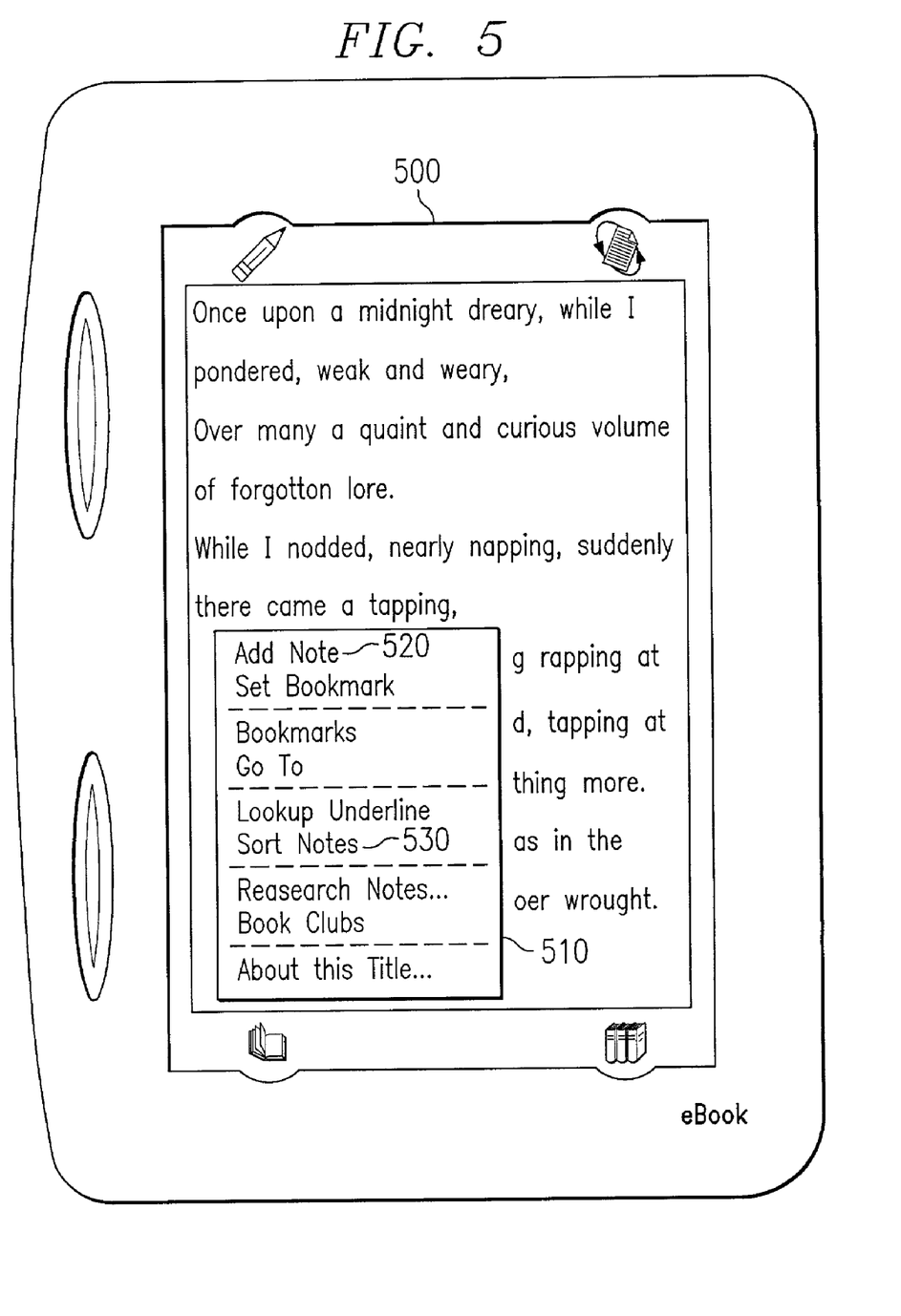
FIG. 5 is a diagram of an electronic book with a pop-up menu displayed in accordance with a preferred embodiment of the present invention.

Next, FIG. 5 is a diagram of an electronic book with a pop-up menu displayed in accordance with a preferred embodiment of the present invention. Many e-books have menus located on the margins of their screens, such as menu 510. Menu 510 may have an option add note 520 as shown in e-book 500. Additionally, menu 510 may allow for sorting of notes using the menu option sort notes 530.

Figure 6:
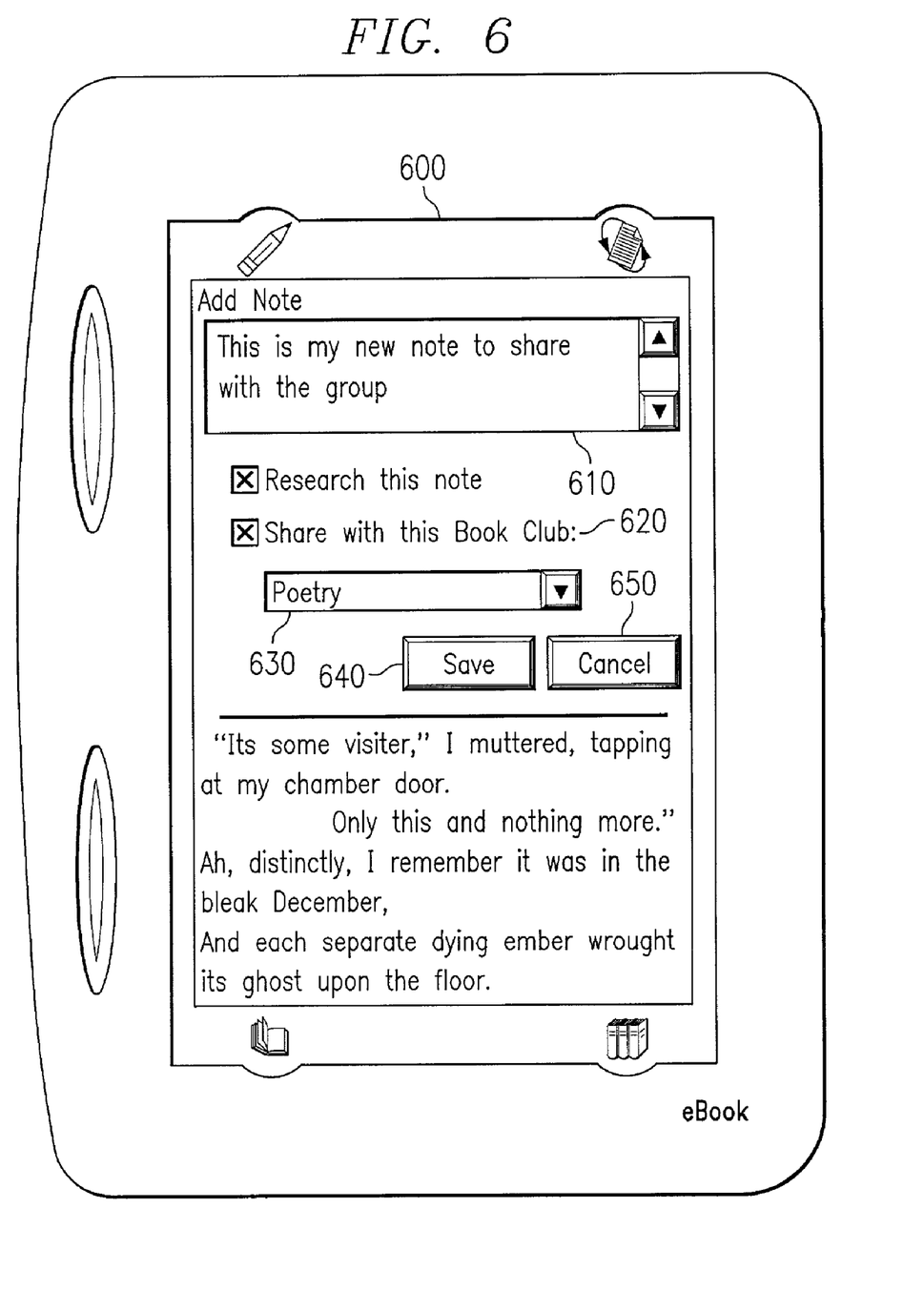
FIG. 6 is a diagram of an electronic book with a pop-up window to add a note in accordance with a preferred embodiment of the present invention.

FIG. 6 is a diagram of an electronic book with a pop-up window to add a note in accordance with a preferred embodiment of the present invention. If the option to a add note, such as option add note 520 in FIG. 5, is selected. Pop-up window 600 to add a note may be displayed in response to a selection of add note 520 in FIG. 5. Scroll box 610 may be used to enter the text for the note. Check box 620 can be marked to tag the note to be shared with a book club or other group of users. Selection box 630 can allow the user to select a particular book club or other group, which will receive the note and associated passage. The user may choose to click on save button 640 to save the note and tag the note to be shared with the selected book club if box 620 is marked. Otherwise, the user may choose to click on cancel button 650 if the note is not to be saved.

When the e-book is connected to an internet enabled client, the present invention parses through all of the notes that have been saved, finds the notes tagged for sharing, and sends the notes to the indicated recipients, such as the book club selected from selection box 630 in FIG. 6.

Figure 7:
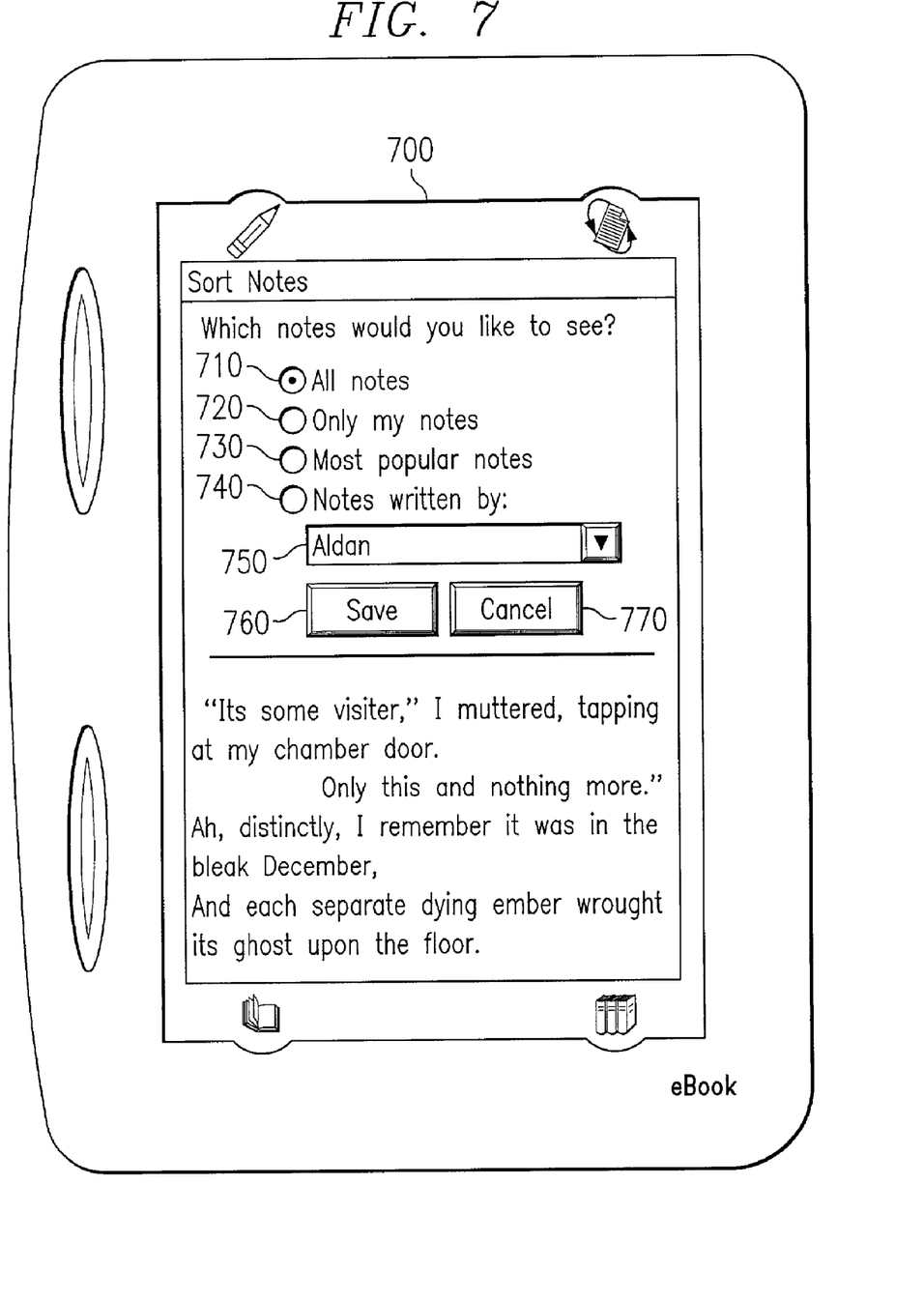
FIG. 7 is a diagram of an electronic book with a pop-up window to sort notes in accordance with a preferred embodiment of the present invention.

FIG. 7 is a diagram of an electronic book with a pop-up window to sort notes in accordance with a preferred embodiment of the present invention. Pop-up window 700 may be displayed in response to a selection of sort note 530 in FIG. 5. An e-book, such as e-book 470 in FIG. 4, may be attached to an internet enabled client to receive new notes from other e-book users. For example, client 410 may send notes from e-book 420 to client 450 of FIG. 4. When an option to sort notes, such as sort notes 530 in FIG. 5, is selected a pop-up window sort notes 700 is displayed. Options, such as options 710, 720, 730, and 740, may be marked by a user to indicate the preferred sorting for the notes.

Selection of option 710 results in all notes, that have been received, being included in the e-book. Selection of option 720 result in only notes made by the user being included in the e-book. Option 730 may be selected to include the most popular notes in the e-book.

The ability to sort notes by author may be implemented by marking option 740 and using selection box 750 to allow the user to select the author of the note. This option allows for a user to select passages and notes for a particular user. The user may choose to click on save button 760 to receive the notes indicated by the marked option. For example, if the all notes option 710 is selected, all notes, that have been received, will be included in the e-book. Otherwise, the user may choose to click on cancel button 770 if the user wants to quit.

Figure 8:
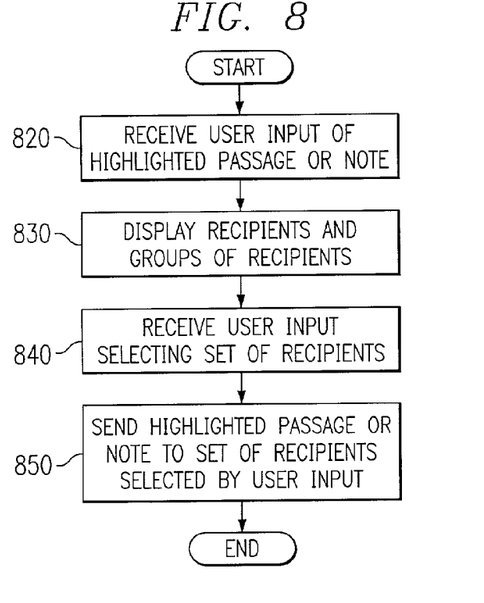
FIG. 8 is a flowchart of the process of selecting recipients and groups of recipients for the highlighted passages and/or notes in accordance with a preferred embodiment of the present invention.

FIG. 8 is a flowchart of the process of selecting recipients and groups of recipients for the highlighted passages and/or notes in which the present invention may be implemented. Highlighted passages and notes refer to text in an e-book, which has be selected or notated for reference. The process illustrated in FIG. 8 may be implemented in a collaboration process, such as collaboration process 430 in FIG. 4.

User input of a highlighted passage and/or note is received (step 820). A list of recipients or groups of recipients may be displayed (step 830). User input is received selecting a set of recipients (step 840) to share the highlighted passage and/or note. A set of recipients may include one user, multiple users, groups of users, or multiple groups of users. The highlighted passage or note is sent to a set of recipients selected by user input (step 850) with the process terminating thereafter.

Figure 9:
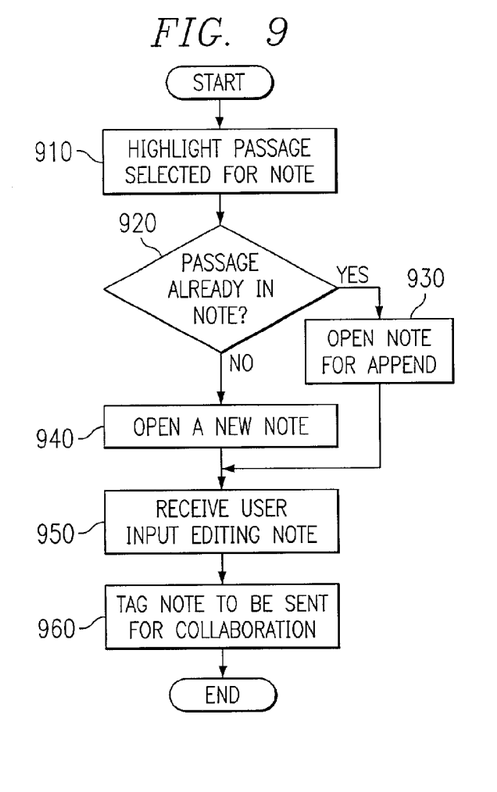
FIG. 9 is a flowchart of the process of maintaining notes for collaboration in accordance with a preferred embodiment of the present invention.

Next, FIG. 9 shows a flowchart of the process of generating a note for collaboration in which the present invention may be implemented. A user has the ability to highlight passages within an e-book and to create a note associated with the passage. User input is received in which the user input highlights a passage for a note (step 910). A determination is made as to whether the passage is already within an existing note (step 920). If the passage is already included in an existing note, then that note is opened for append (step 930). In other words, the note is opened so that additional text may be added to the note. Otherwise, a new note is opened for the highlighted passage (step 940). User input editing the note is then received (step 950). The process also proceeds to step 940 from step 930 if the note is opened for appending. The note is tagged so that it may be sent for collaboration (step 960) with the process terminating thereafter.

Figure 10:
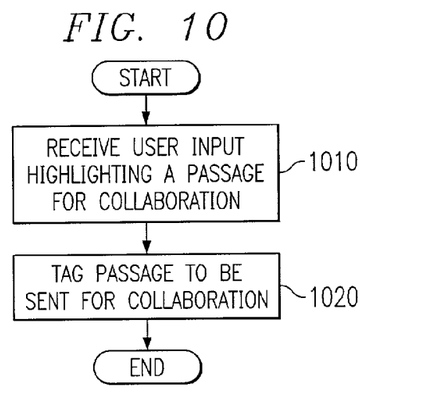
FIG. 10 is a flowchart of the process of maintaining highlighted passages for collaboration in accordance with a preferred embodiment of the present invention.

FIG. 10 shows a flowchart of the process of highlighting passages for collaboration in which the present invention may be implemented. The process illustrated in FIG. 10 may be implemented in a collaboration process, such as collaboration process 430 in FIG. 4.

User input is received of a passage being highlighted for collaboration (step 1010). The passage is tagged so that it may be sent for collaboration (step 1020) with the process terminating thereafter.

Figure 11:
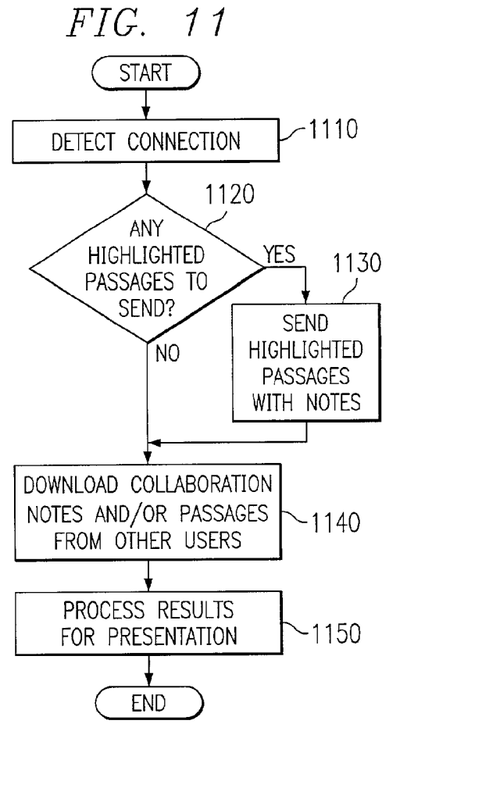
FIG. 11 is a flowchart of the process of sending highlighted passages and/or notes to a set of recipients in accordance with a preferred embodiment of the present invention.

Next, FIG. 11 shows a flowchart of the process of sending highlighted passages and/or notes to a set of recipients in which the present invention may be implemented. The process illustrated in FIG. 11 may be implemented in a collaboration process, such as collaboration process 430 in FIG. 4.

The highlighted passages or notes are automatically sent to a designated set of recipients through the use of the Internet as discussed in FIG. 1. The process begins by detecting a connection to the Internet (step 1110). A determination is made as to whether highlighted passages and/or notes are present to be sent (step 1120). If there are any highlighted passages and/or notes to be sent, the highlighted passages are sent with the associated notes to the highlighted passage (step 1130). The collaborated highlighted passages and/or notes from other users may be downloaded to the current user's e-book (step 1140). The results are processed for presentation in the current e-book (step 1150) with the process terminating thereafter.

Figure 12:
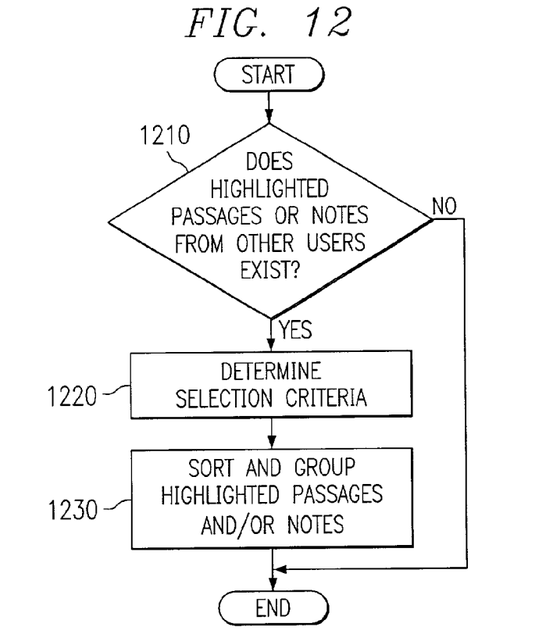
FIG. 12 is a flowchart of the process of receiving highlighted passages and/or notes from other users in accordance with a preferred embodiment of the present invention.

FIG. 12 is a flowchart of the process of receiving highlighted passages and/or notes from other users in which the present invention may be implemented. The process illustrated in FIG. 12 may be implemented in a collaboration process, such as collaboration process 430 in FIG. 4.

The recipients can receive or download the highlighted passages and/or notes, which were sent from other users, into their e-books. The process begins by determining whether highlighted passages or notes for the user exist (step 1210). If highlighted passages and/or notes from other users exist for the e-book, the selection criteria are determined for downloading the highlighted text into the e-book (step 1220). The passages and notes are sorted and grouped using a set of criteria (step 1230) with the process terminating thereafter. Users of the present invention can specify criteria, which is used to group and sort the highlighted passages and/or notes For example, a user can choose to order the received highlighted text based on popularity with the most popular highlighted text listed first. Additionally, a user may choose to order the highlight text from a particular user first.

Figure 13:
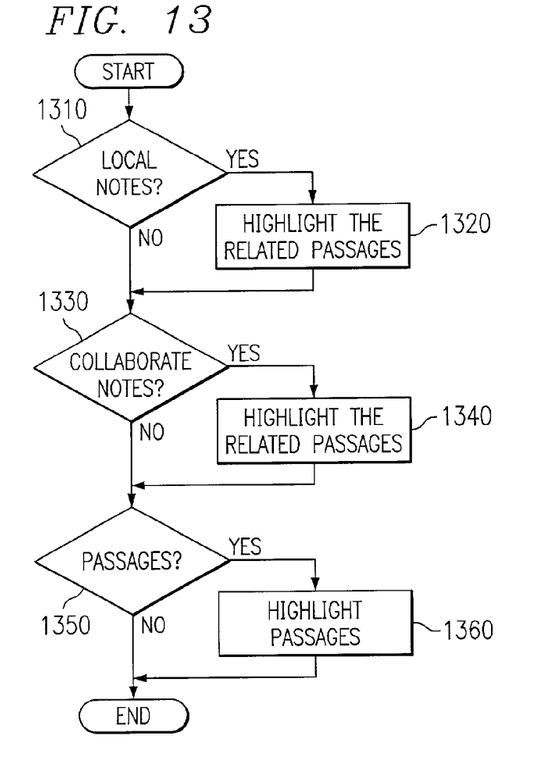
FIG. 13 is a flowchart of the process of displaying highlighted passages and/or notes in accordance with a preferred embodiment of the present invention.

FIG. 13 is a flowchart of the process to display highlighted passages or notes in which the present invention may be implemented. The process illustrated in FIG. 13 may be implemented in a collaboration process, such as collaboration process 430 in FIG. 4.

The process begins by determining whether local notes are present (step 1310). This step identifies which notes are notes on the current user's e-book. Local notes are notes created by a user on the e-book, while collaboration notes are notes received by the user from other users of the e-book.

If there are local notes present, the related passages to the notes are highlighted (step 1320). These passages are the text within the e-book that have been marked as being associated with the note. Next, a determination is made as to whether collaboration notes are present (step 1330). If collaborative notes are present, the related passages to those notes are highlighted (step 1340). A determination is made as to whether passages are present in which the passages are to be highlighted (step 1350). If there are passages present, these passages are highlighted (step 1360) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, the illustrated examples are described with respect to an e-book. The mechanism of the present invention may be implemented for use with other electronic documents, including, for example, an email message, a word processing document, and an HTM page. Additionally, text forming passages may be highlighted in a number of ways in the depicted examples. A color may be used to graphically indicated the text, such as yellow to simulate highlighting of the text with a yellow marker. The text may be highlighted in other ways, by bolding the text, underlining the text, or italicizing the text. Also, a change in font type or size may be used to highlight text. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for sharing text in an electronic book, the method comprising:

receiving selected text from at least one remote electronic book through a communications link to the data processing system, wherein the selected text includes passages from the at least one remote electronic book, and a copy of the passages from the at least one remote electronic book is also contained in the electronic book;

responsive to a user input, sorting the selected text from the at least one remote electronic book using a selection criteria to form sorted text, wherein the selection criteria is received with the selected text;

displaying the sorted text; and responsive to a user input selecting at least a portion of the sorted text being displayed, highlighting portions of the electronic book based on the user input, wherein the highlighted portions of the electronic book correspond to the selected text received from that at least one remote electronic book.

2. The method of claim 1, wherein selection criteria is used to sort and group the selected text.

3. The method of claim 1, wherein the selection criteria includes at least one of popularity, name of a user originating text within the selected text, and subject matter of portions of text within the selected text.

4. The method of claim 1, wherein the selected text includes annotations made by a user.

5. The method of claim 1, wherein the sorted text excludes a portion of the selected text.

* * * * *